(12) United States Patent
Dewar et al.

(10) Patent No.: US 8,966,692 B2
(45) Date of Patent: Mar. 3, 2015

(54) BRIDGE COMPOSITE STRUCTURAL PANEL

(76) Inventors: Crawford Dewar, Rockwood (CA); Josh Dewar, Seaforth (CA); Ben Dewar, Mitchell (CA)

( * ) Notice: Subject to any disclaimer, the term of this patent is extended or adjusted under 35 U.S.C. 154(b) by 70 days.

(21) Appl. No.: 13/249,991

(22) Filed: Sep. 30, 2011

(65) Prior Publication Data

US 2013/0081347 A1 Apr. 4, 2013

(51) Int. Cl.
| | |
|---|---|
| *E01D 19/12* | (2006.01) |
| *B21D 47/00* | (2006.01) |
| *B32B 3/02* | (2006.01) |
| *E04C 2/38* | (2006.01) |
| *B32B 37/10* | (2006.01) |
| *B29C 70/34* | (2006.01) |
| *B29C 70/44* | (2006.01) |
| *E04C 2/24* | (2006.01) |
| *B32B 38/04* | (2006.01) |
| *E01D 101/10* | (2006.01) |

(52) U.S. Cl.
CPC . *B21D 47/00* (2013.01); *B32B 3/02* (2013.01); *E04C 2/38* (2013.01); *B32B 37/1018* (2013.01); *B32B 2038/047* (2013.01); *B32B 2317/16* (2013.01); *B32B 2363/00* (2013.01); *B32B 2419/00* (2013.01); *B29C 70/342* (2013.01); *B29C 70/443* (2013.01); *E04C 2/24* (2013.01); *E01D 2101/10* (2013.01)
USPC ............................................................ 14/73

(58) Field of Classification Search
CPC ............ B32B 2363/00; B32B 2419/00; E01D 2101/10
USPC ................. 52/309.14, 588.1, 783.1, 834, 847
See application file for complete search history.

(56) References Cited

U.S. PATENT DOCUMENTS

| | | | | |
|---|---|---|---|---|
| 3,755,983 | A | * | 9/1973 | Beckham ........................ 52/326 |
| 3,769,143 | A | * | 10/1973 | Kulesza ........................ 428/151 |
| 4,079,476 | A | | 3/1978 | Green |
| 5,150,509 | A | * | 9/1992 | Wils ........................... 29/525.04 |
| 5,439,749 | A | * | 8/1995 | Klasell et al. ............... 428/537.1 |
| 5,501,054 | A | * | 3/1996 | Soltis et al. ...................... 52/847 |
| 2002/0020033 | A1 | * | 2/2002 | Lang .................................. 14/73 |
| 2002/0122954 | A1 | | 9/2002 | Dagher |
| 2004/0103613 | A1 | | 6/2004 | Salzsauler et al. |
| 2006/0252328 | A1 | * | 11/2006 | Bingenheimer .............. 442/180 |
| 2007/0180982 | A1 | | 8/2007 | Dagher et al. |

\* cited by examiner

*Primary Examiner* — Charles A Fox
*Assistant Examiner* — Patrick Maestri
(74) *Attorney, Agent, or Firm* — Lorelei G. Graham

(57) ABSTRACT

A composite structural panel is provided. The panel comprises a top reinforced fiber layer, a top infusion medium layer, a core, a bottom infusion medium layer, and a bottom reinforced fiber layer. The composite structural panel is infused with a potting material, preferably an epoxy resin, that extends throughout the composite structural panel to provide composite action. The wood core comprises wood beam elements aligned in the longitudinal direction relative to the steel beams or girders of a supporting frame. Mechanical and chemical means are utilized to connect the composite structural panel to the supporting frame.

13 Claims, 8 Drawing Sheets

BRIDGE COMPOSITE STRUCTURAL PANEL

FIELD OF THE INVENTION

The present invention provides for a composite structural panel and process for manufacturing said structural panel. The composite structural panel can be used as a bridge deck and utilizes both mechanical and chemical connecting means between the bridge frame and composite structural panel.

BACKGROUND OF THE INVENTION

Bridge codes in North America have incorporated wood as an approved material for bridges. Bridges with steel girders and wood decking usually consist of wood laminated together by nailing in a "W" pattern about 4" on center. These bridges suffered from two major disadvantages. The first, the decking is used solely for transmitting loads to the steel girders. The wood does not actively participate or contribute in sustaining the longitudinal moment. The second disadvantage is that the nail connections between the wood laminates become loose after a few years of service, leading to deterioration of the riding surface.

Although timber is a widely used structural material, inherent to many products of nature, the strength and elastic modulus values may vary widely. However it is known that the longitudinal modulus of elasticity has its highest value amongst the various moduli of wood and the compression resistance of timber parallel to the grain is approx. 2.0 to 6.0 times greater than that perpendicular to the grain.

Wood decking utilizing wood beams oriented transverse to the bridge frame has commonly been used in the past. The transverse laminated wood decking cannot share a large portion of the longitudinal moments carried by the steel beams because of the low elastic modulus in the radial and tangential direction is generally about $\frac{1}{20}$ of the longitudinal modulus of elasticity.

However, reorienting the decking so that the wood laminates are parallel to the steel beams and developing composite action between the wood laminated deck and the steel girders helps to utilize efficiently the dominant rigidity of the wood decking and higher compressive resistance of the wood laminates to the grain. (i.e. beams parallel to steel can share longitudinal moment). As a result of this reorientation, composite action is achieved.

Prior art has described wrapping individual wood beams with layers of fibreglass to increase the strength and stiffness of the laminated wood beam by cube for every 4 mm of laminate but getting the process correct for large bridge decks requires a great deal of time and money.

In the past, the loosening of nail connections was observed in both transverse laminated and longitudinal laminated wood decks and confirmed to be the cause of reduced load capacity of bridges and/or deteriorated riding surfaces. The post tensioning technique was implemented to prevent the problem of loosening nail connections, helping to rehabilitate many existing bridges and increase the functionality of new bridge designs with longer service life and formulating specifications to design post tensioned bridge decks incorporated into US and Canadian bridge codes.

It would be beneficial to provide a bridge deck and structure comprising a wood core with reliable means of connecting the deck panel components, reliable means of securing the deck panel to the bridge frame, and providing composite longitudinal moment supporting action between the bridge frame and the bridge deck.

SUMMARY OF THE INVENTION

A composite structural panel comprising at least one reinforced fibre layer, at least one infusion medium layer, a wood core, and a potting material, wherein a bottom reinforced fibre layer is adapted below and engagingly to a bottom infusion medium layer, wherein the bottom infusion medium layer is adapted below and engagingly to the wood core, wherein a top infusion medium is adapted above and engagingly to the wood core, wherein a top reinforced fibre layer is adapted above and engagingly to the top infusion medium layer wherein the potting material is adapted to impregnate the reinforced fibre layers, the infusion medium layers, and surround the wood core to act as a binding matrix to create a final composite material.

In one aspect of the invention, the wood core comprises a plurality of wooden beam elements, wherein the wood beam elements are preferably glulam wood beam elements aligned parallel to each other and adjacently or cross laminated where cross laminated timber is used. Preferably, the glulam wood beam elements are finger joints and more preferably at least one of the finger joints is dadoed with a rectangular groove running the top and bottom of the length of the beam.

In a preferred embodiment of the invention, the wood core comprises a plurality of wood beam elements wherein the wood beam elements are adapted adjacently and engagingly to each other, wherein the wood beam elements are aligned parallel to each other.

In another aspect of the invention, the plurality of wood beam elements comprises a plurality of glulam wood beam elements, and more preferably finger joints.

In another aspect of the invention, at least one of the plurality of wood beam elements, is dadoed with a rectangular groove running the top and bottom of the length of the beam.

In another aspect of the invention, the wood beam elements of the composite structural panel run parallel at least one girder of a frame supporting the composite structural panel.

In a preferred embodiment of the invention, each layer of reinforced fibre comprises multiple layers of reinforced fibre, having a longitudinal general fibre orientation relative to the wood beam elements. Preferably, the outermost reinforced fibre layer comprises an outer layer of reinforced fibre having a transverse general fibre orientation relative to the wood core elements, wherein the outer layer of reinforced fibre encases the length and width of the composite structural.

In an aspect of the invention, the potting material is a substance or combination of substances of suitable viscosity such that they can be used to impregnate the reinforced fibre, the infusion medium layers and surround the wood core whereby the potting material can undergo a physical state transformation from a low viscosity fluid to a rigid solid state.

In another aspect of the invention, the composite structural panel comprises holes extending from the top surface to the bottom surface, whereby at least one pipe extends through each of said holes.

In another aspect of the invention, the pipes are wrapped with reinforced fibre oriented in the zero direction.

In an aspect of the invention mechanical connecting means extend through the holes.

In another aspect of the invention, the mechanical connecting means is selected from a list consisting of a bolt, a A325 bolt, a grade 8 bolt or the combination of at least one bolt, at least one washer, and at least one nut.

In another aspect of the invention the infusion medium layers comprise wire, more preferably chicken wire.

An embodiment of the invention provides a process of manufacturing a composite structural panel, the process comprising aligning wood beam elements in parallel, whereby at least part of at least side of each beam is abutting at least part of at least once side of an adjacent beam to form a composite wood core, applying continuous force to the transverse axis of the wood core to compress the adjacent sides of the wood beams towards each other, drilling staggered holes in the wood core, installing pipes in the holes in the wood core, installing a reinforced fibre layer, installing an infusion medium layer on top of the reinforced fibre layer, installing the wood core on top of the infusion media layer, installing an infusion medium layer on top of the wood core, installing a reinforced fibre layer on top of the infusion media layer, applying a vacuum seal to the composite structural panel, infusing the composite structural panel with a potting material, wherein the potting material undergoes a physical state transformation from a low viscosity fluid to a rigid solid state to act as a binding matrix between the reinforced fibre, the infusion medium, and the wood core to create a final composite material.

Another aspect of the invention provides a process of manufacturing a composite structural panel comprising sandblasting the top of a bridge frame to white metal, applying thixotropic glue and then one layer of reinforced fibre to the top surface of the bridge frame, applying a layer of thixotropic glue, placing the composite structural panel on the prepared bridge frame, placing mechanical connecting means through the aligned holes previously predrilled in the frame and composite structural panel, and tightening the mechanical connecting means to a minimum of 7 tons or 325 foot pounds of force between the composite structural panel and the frame within the exothermic window of the thixotropic glue.

BRIEF DESCRIPTION OF THE DRAWINGS

A detailed description of the preferred embodiments are provided herein below by way of example only and with reference to the following drawings, in which:

FIG. 5 is a longitudinal cross sectional view illustrating a method of vacuum sealing the composite structural panel in accordance with an embodiment of the present invention;

Figure 1:
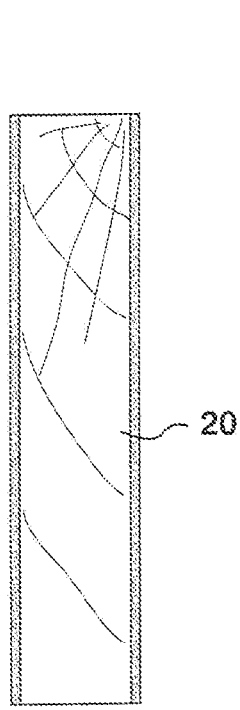
FIG. 1 is a longitudinal view illustrating a wood beam element in accordance with an embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 2:
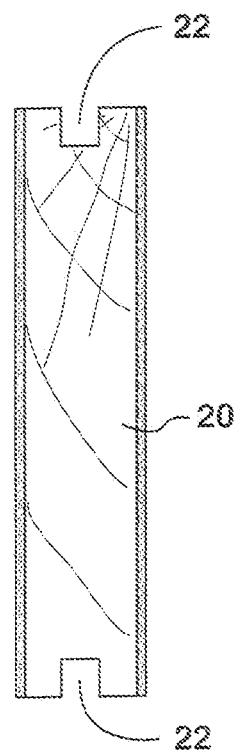
FIG. 2 is a longitudinal view illustrating a dadoed wood beam element in accordance with an embodiment of the present invention.
Figure 3:
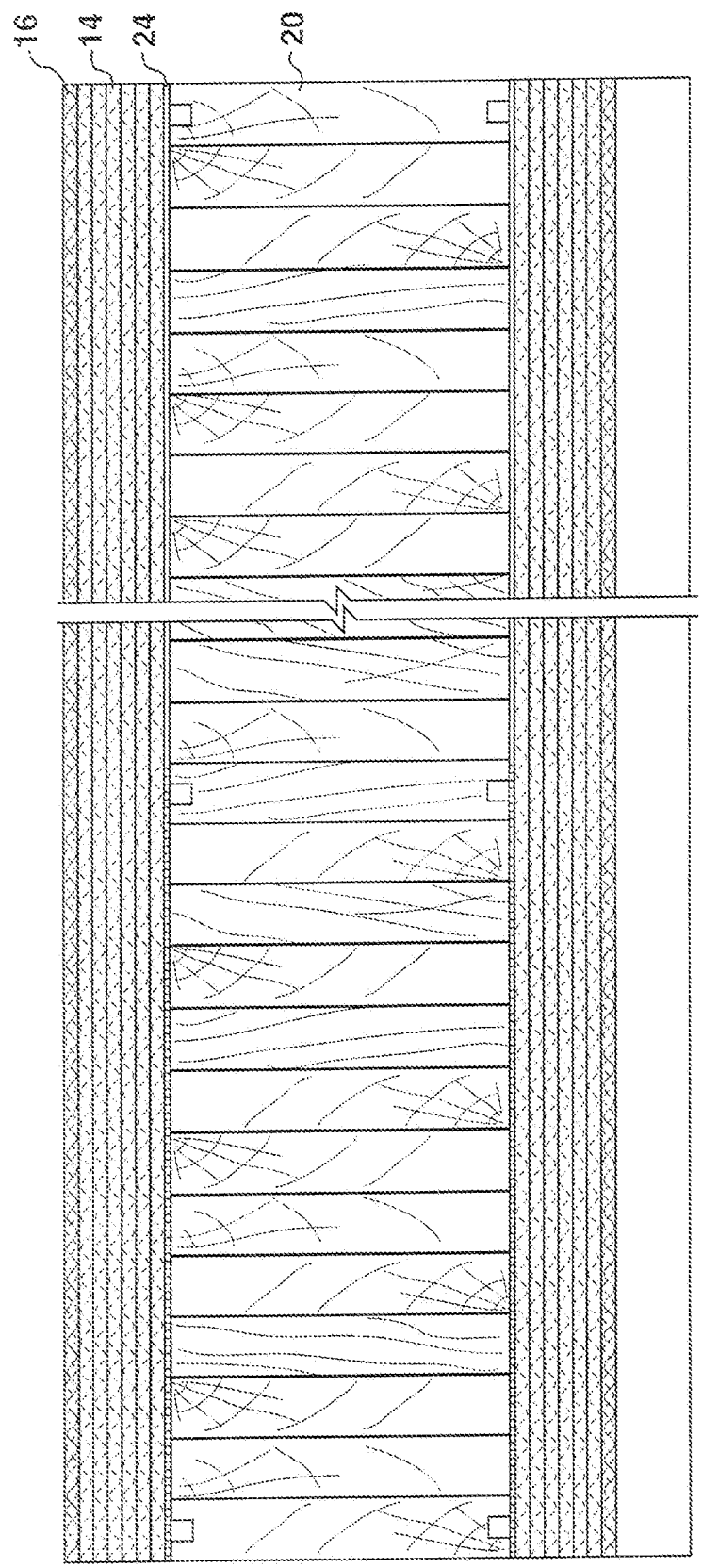
FIG. 3 is a longitudinal cross sectional view illustrating a composite structural panel in accordance with an embodiment of the present invention.
Figure 4:
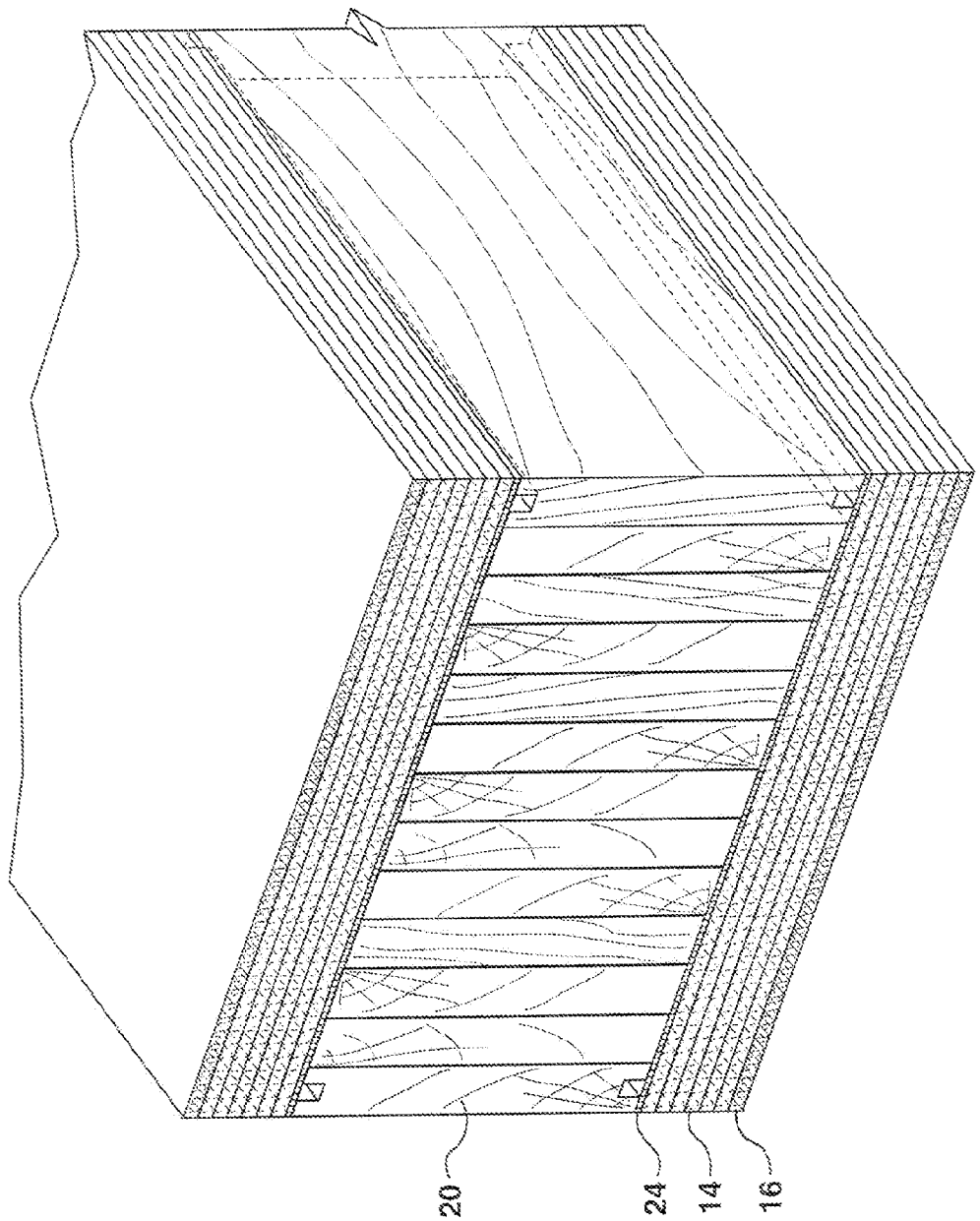
FIG. 4 is a broken away view of a composite structural panel of FIG. 3 in accordance with an embodiment of the present invention.
Figure 5:
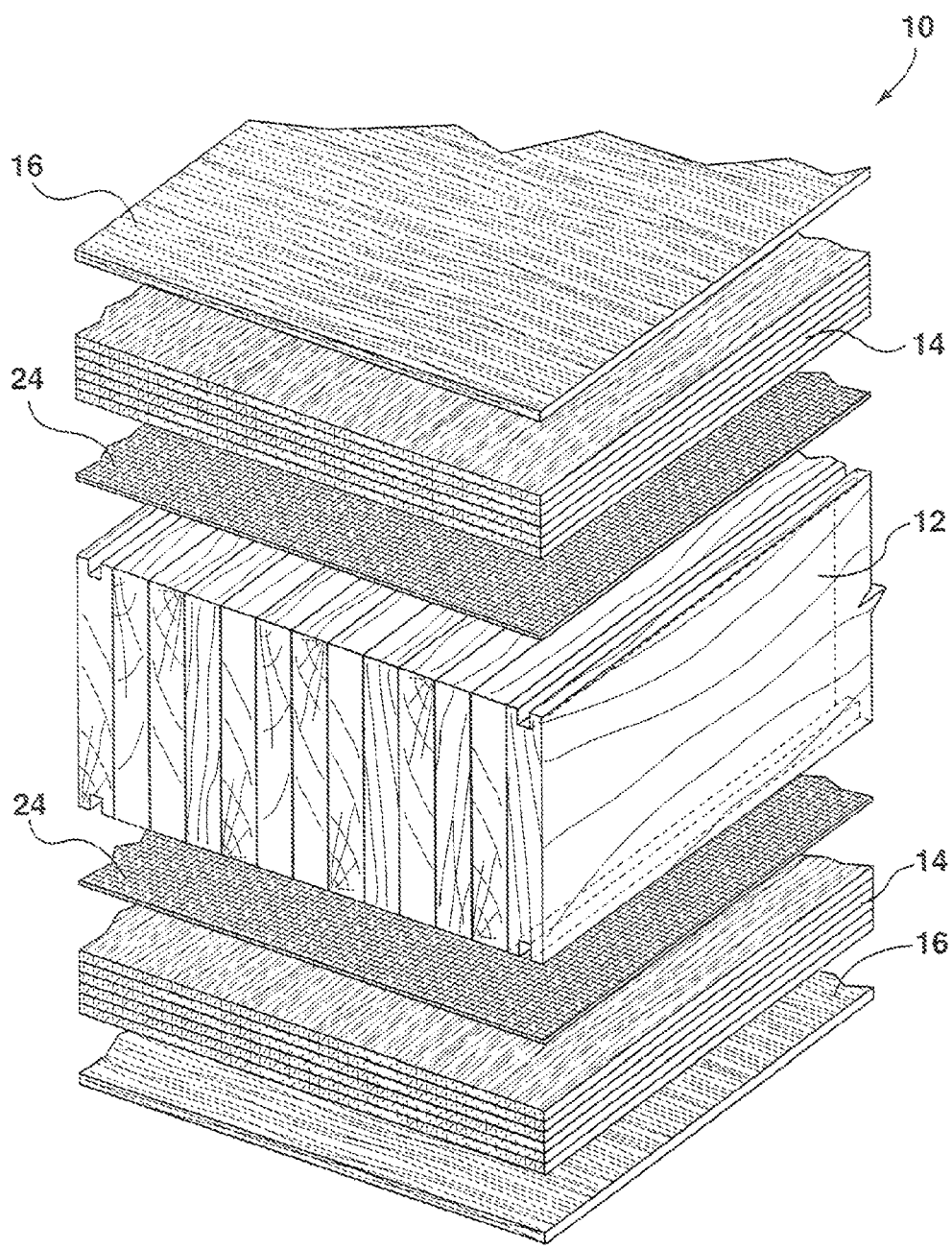
FIG. 5 is an exploded view of the constituent components of the composite structural panel of FIG. 3 in accordance with an embodiment of the present invention.
Figure 6:
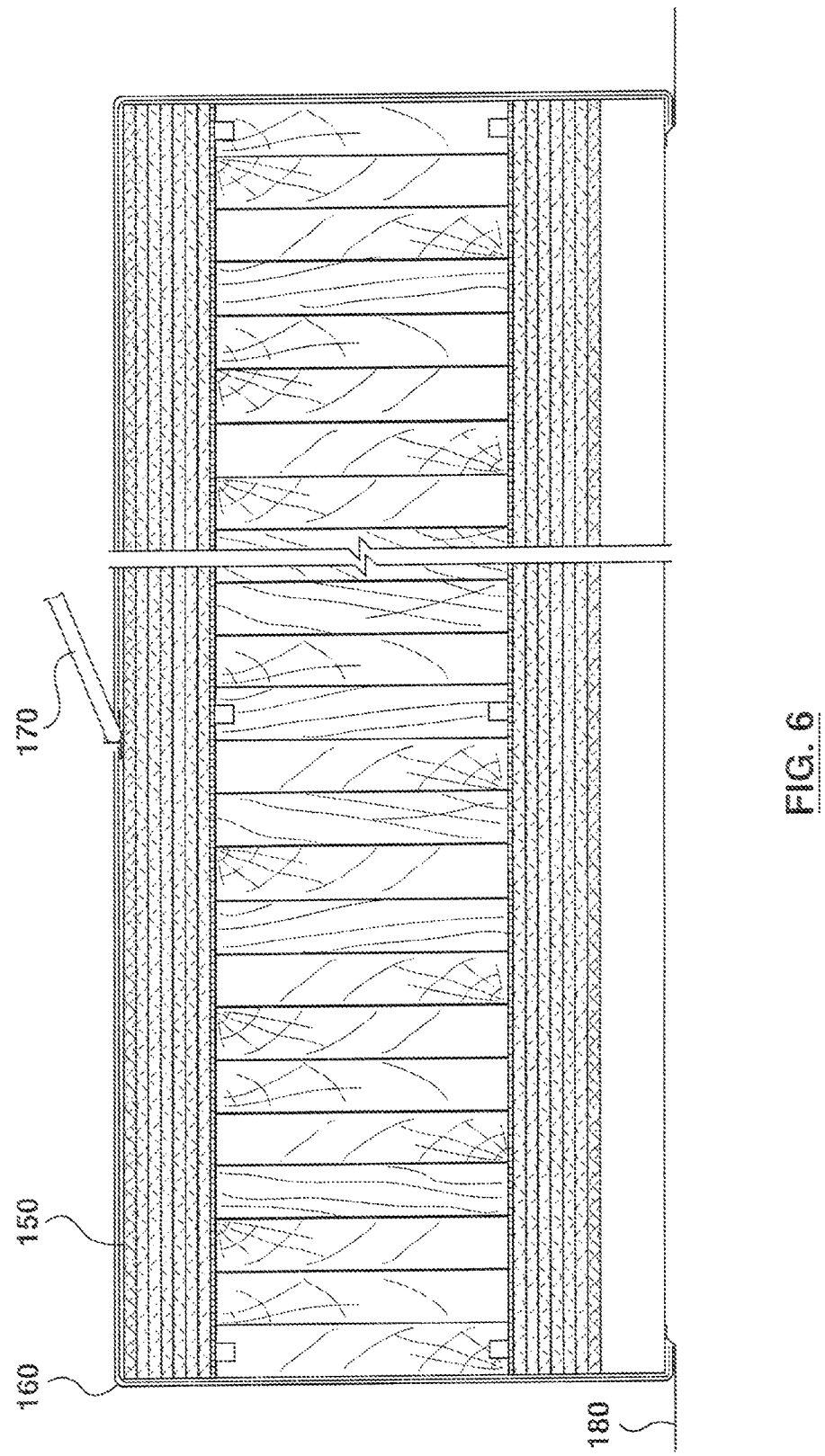
FIG. 6 is a longitudinally oriented top view of a wood core in accordance with an embodiment of the present invention.
Figure 7:
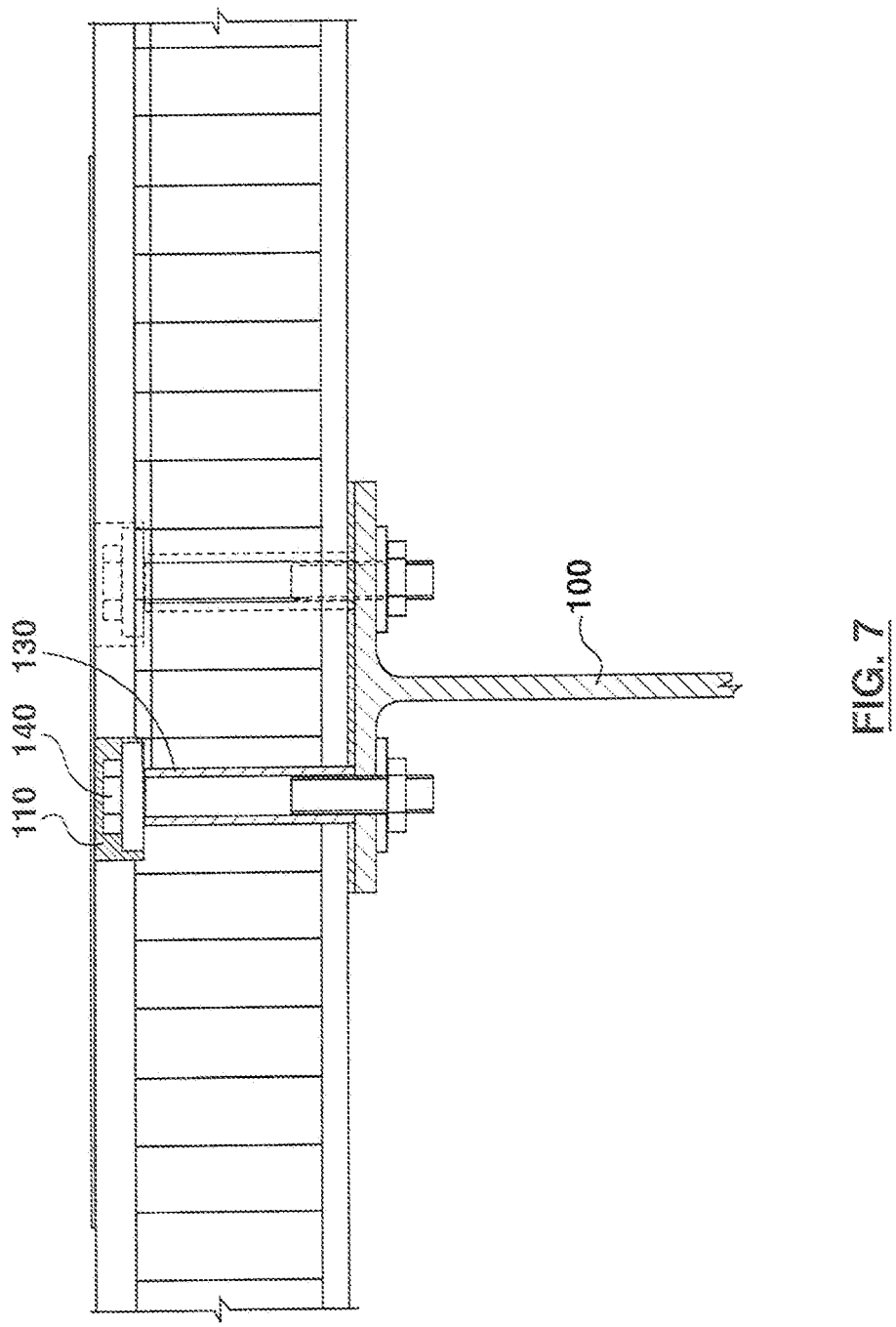
FIG. 7 is a longitudinal cross sectional view of a composite structural panel connected to a steel girder in accordance with an embodiment of the present invention.
Figure 8:
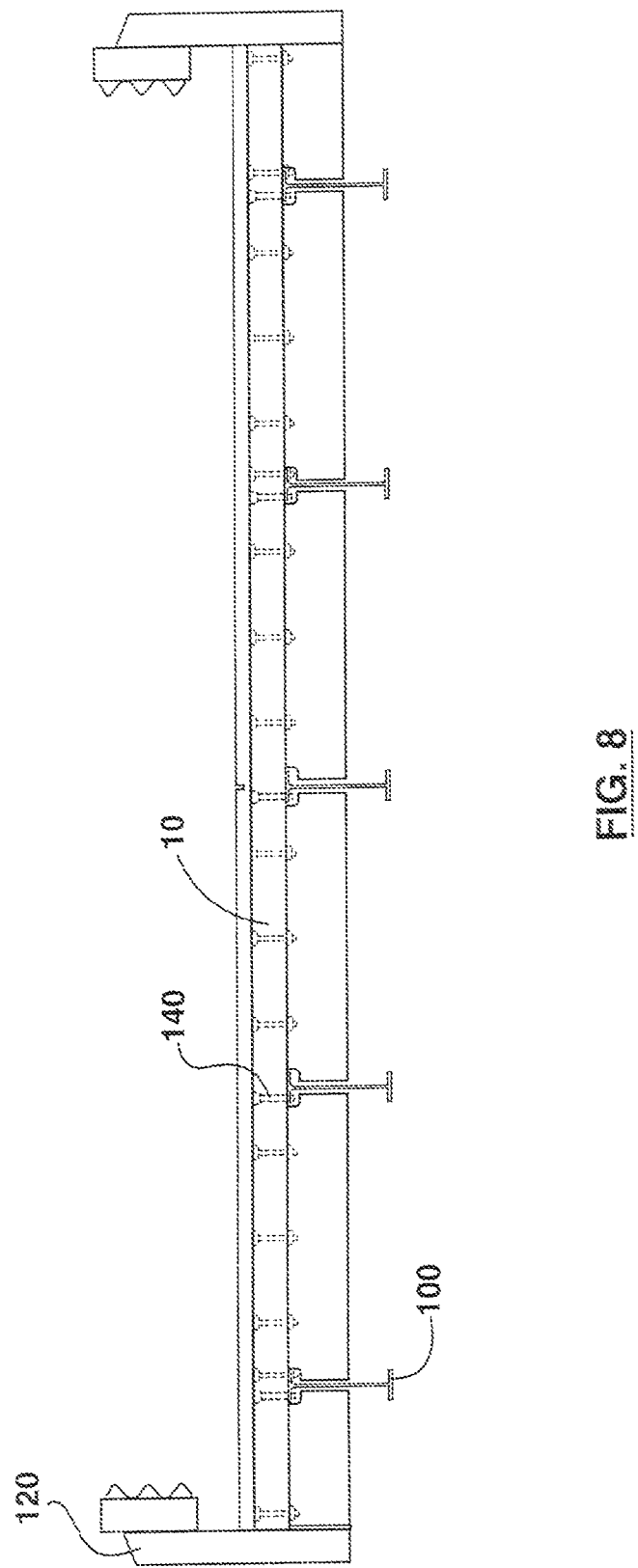
FIG. 8 is a longitudinal view of a composite structural panel connected to a frame comprising steel girders in accordance with an embodiment of the present invention.
Figure 9:
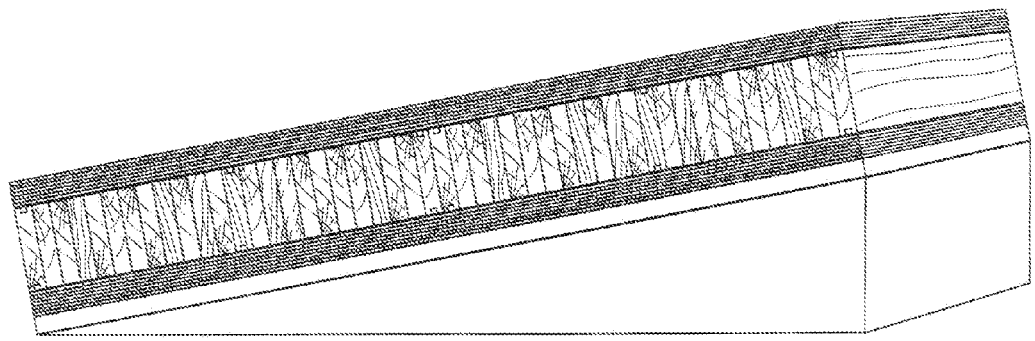
FIG. 9 is a perspective view of the cross fall namely of a wedge positioned under the composite structural panel in accordance with an embodiment of the present invention.

Referring to FIGS. 1 to 8 the present invention provides a composite structural panel 10 that can be utilized to construct a modular bridge deck. The composite structural panel 10 comprises a wood core 12, an infusion medium layer 14 above and below the wood core 12, and a reinforced fibre layer 16 above the top infusion medium layer 14 and below the bottom infusion medium layer 14. In one embodiment, an encasing reinforced fibre layer may wrap around the length and width of the outside of the panel. In a preferred embodiment of the invention, the composite structural panel is infused with epoxy.

The wood core 12 may comprise a plurality of wood beam elements 20, preferably glulam beams, each wood beam element 20 having a longitudinal axis and at least one side generally parallel to and facing at least part of a side of at least one adjacent beam 20. The beams are in parallel and having adjacent sides abutting each other.

In a preferred embodiment of the invention, the wood beam elements 20 comprise finger joint lumber with a certified modulus of 2.1 million, typically 1.5" thick by 8" wide and up to 60' long. Every $12^{th}$ finger joint lumber may be dadoed with a ½" by ½" groove 22 the length of the wood beam element, top and bottom. The adjacent sides of the beams can be bonded by an adhesive, as well as through application of force to the transverse axis of the finger joints. The adhesive is preferably phenol resorcinol formaldehyde glue.

The wood beam elements 20 may also comprise of cross laminate timber which are typically formed using planed "lamellas" laid and glued using formaldehyde-free, food-grade glue in a vacuum press in alternate layers, at 90 degrees to each other, creating panels that are from 3 to 11 layers thick. These panels form a robust, structurally strong building system.

The infusion medium layers 14 can further include wire 24, preferably chicken wire, or other wire such as ultra tensile wire.

The reinforced fibre 16 comprises a fibrous material that is constructed of engineering materials having a high tensile strength. In the preferred embodiment, the reinforced fibre is fibreglass, or basalt or other hybrid carbon material. In alternate embodiments, a fibrous material is in cord filament woven into a fabric. The reinforced fibre in sheet form may have a variety of fibre architectures. In a preferred embodiment, the fibres are woven. Alternately, the reinforced fibres may be braided or knitted. The majority of the fibres in the sheet form are preferably unidirectional in the longitudinal direction of the sheet form.

The reinforced fibre 16 in the sheet form are preferably aligned generally longitudinally (i.e. parallel) relative to the longitudinal axis of the wood beam elements 20. In the embodiment comprising an encasing fibre glass layer wrapping around the length and width of the outside of the panel, the preferred fibre direction of the encasing fibre glass layer is generally transverse relative to the longitudinal axis of the beams and the longitudinally aligned fibres of the inner fibre glass layers.

In a preferred embodiment of the invention, the fibrous material is a member selected from the group consisting of 55 ounce knit fibreglass, glass, carbon, Kevlar™, aramids, nylon, possibly natural fibres (e.g. hemp), and combinations of the foregoing.

The composite structural panel 10 may further comprise of epoxy (not shown) that extends throughout and encases the beam elements, wire, and fibreglass. The epoxy can be any potting material that is a curable resin such as vinyl esters, poly esters, urethanes, BMIs, phenolics, acrylics, epoxies, cynate esters, and thermoplastics. The potting material is preferably an epoxy that has exceptional adherence to steel, such as Jeffco 4101-08 epoxy resin and Jeffco 4101-18 epoxy hardener as manufactured by Jeffco Ltd. of San Diego, Calif.

The term "resin" refers to any substance, or combination of substances, of suitable viscosity, such that they can be used to impregnate the fibrous materials 16, the infusion medium layers 14, and surround the plurality of wood beam elements 20 and ultimately undergo a physical state transformation from a low viscosity fluid to a rigid solid state wherein said transformation can occur via various means such as chemical reactions, a thermal cycle, and acts as a binding matrix of the fibrous material, wire, and beams to create a final composite material or composite structural panel 10.

A "Vacuum Assisted Resin Transfer Method" (VART) may be utilized to encase the beam/wire/fibrous material structure in resin. This is a known method of impregnating fibres with resin.

The composite structural panel 10 preferably comprises holes 110 extending from the top surface to the bottom surface of the panel 10. The holes 110 provide means for pipes 130 to protrude from the top surface to the bottom surface of the panel and are preferably staggered about 500 mm between pipes, and are aligned along girders 100 of the frame 100 design of a bridge superstructure 120. The pipes 130 provide means to connect the composite structural panel 10 to a frame, whereby connecting means 140 may be inserted through the pipes 130 to connect the panel 10 to the frames 100. The connecting means 140 is preferably bolts which extend from the top of the pipes 130 through to the bottom face of the top of girders 100 of the frame and acts to sandwich the panel and frame to create greater composite action in supporting longitudinal moments.

In a preferred embodiment of the invention, the pipes 130 are comprised of steel. More preferably, the outer surface of each pipe is wrapped in reinforced fibre oriented in the zero direction.

The bolts can be any means of mechanically connecting the panel to the frame which has a diameter allowing it to fit through the pipes extending from the top to bottom surfaces of the panel. Various securing means are known to one skilled in the art of mechanical engineering. The preferred connecting means comprises a bolt, at least one washer and at least one nut, whereby the securing means provides the ability to provide up to 325 foot pounds of force between the composite structural panel and frame. The bolt may be a typical A325 or Grade 8 bolt with an approximate 7 ton value of shear capacity. The purpose of the bolt is to provide a mechanical connection between the composite structural panel and the frame.

In an embodiment of the invention, the predrilled hole containing mechanical connecting means is filled with an adhesive to provide chemical connecting means. Preferably, the adhesive is thixotropic glue. More preferably, the thixotropic.

The instant invention may be manufactured by a process comprising applying an adhesive to at least one side of each beam, aligning beams in parallel to each other with adjacent sides abutting, and applying force along the transverse axis (or may also be applied along a vertical axis when cross laminated timber is being assembled), of the glued lumber, thereby compressing the aligned beams towards each other to form the wood core of the composite structural panel. In the preferred process of manufacture, 100 psi (80-150 psi range) of force is applied to the beams continuously for about 6 hours (and can be dependent on the adhesive being used.

Holes may be drilled in the wood core for insertion of pipes. The holes may be staggered to align with the girder flanges or diaphragm of a frame of a bridge superstructure. Preferably, the holes are staggered every 500 mm (200-500 mm range) and are drilled using a hole jig.

Pipes are inserted into each hole, preferably extending from the top surface of the panel to the bottom surface of the panel. In an embodiment of the process, the outer surface of the pipes may be wrapped with fibre glass and each pipe may be filled with liquid closed cell cellular foam so as to keep the resin out or in another embodiment of the process, to keep out the environmental elements during transportation.

One layer of reinforced fibre with fibres generally oriented in the transverse direction is rolled out with enough reinforced fibre to allow for a double overlap. At least one layer and preferably 6 layers of reinforced fibre with fibres generally oriented in the longitudinal direction, is applied on top of the initial reinforced fibre mat. At least one layer of infusion media, preferably by rolling out a layer of chicken wire, is applied to the top reinforced fibre layer. The wood core is then placed on top of the infusion media with the bottom surface of the wood core adjacent to and abutting the infusion media. At least one layer of infusion media is applied to the top surface of the wood core. At least one layer, and preferably 6 layers, of reinforced fibre mat with fibres generally oriented in the longitudinal direction, is rolled out on the top surface of the layer of infusion media applied to the top surface of the wood core. The double overlap of the bottom reinforced fibre mat layer is then applied to overlap the outer surface of the reinforced fibre mat layer positioned above the top surface of the wood core.

In a preferred embodiment of the process of manufacture of a composite structural panel, the composite structural panel is infused with a potting material such as epoxy, said infusion being performed through processes known to those skilled in the art.

Infusion can be performed by installing a layer of release film 150 and non-porous plastic wrap 160 the length and width of the panel, installing tubes 170, preferably omega tubes, on the top length of the deck, and connecting said tubes to vacuum hoses with vacuum means provided by a vacuum pump. A full vacuum is applied at about 27" mercury (12 to 14 psi range) with no leakages from the vacuum seal. Infusion hoses connected to epoxy mixing pumps on one end are inserted from the opposite unconnected end of grooves in the top and bottom surfaces of the beams comprising the wood core. The insertion is preferably approximately 3". The plastic encasing of the composite structural panel should be sealed, preferably with sealant tape 180, to prevent leakage under vacuum. A second vacuum sealing should be applied by the vacuum pump to verify 27" mercury (12 to 14 psi range) with no leaks. Once full vacuum has been achieved across the length and width of the deck, the epoxy mixing station, preferably comprising two parts resin and one part hardener, should be initiated and the deck may be infused with the epoxy material at a temperature preferably between 90-94° Fahrenheit. Once the composite structural panel 10 has been infused, the temperature may be increased to 130° Fahrenheit (105° F. to 130° F. range) until full termination is reached. Once the infused epoxy has set, the non-porous plastic wrap 160, and infusion tubes 170 are removed.

To connect the composite structural panel to girders 100 manufactured into a steel superstructure modular frame, the frame can be prepared by first sandblasting the top of the girder flanges free to white SP-10 and drilling holes in the frame staggered to align with holes drilled in the wood core.

An adhesive layer may be applied to the top surface of the girders which make up the frame, preferably 2 mm (range of 2 mm to 18 mm depends on shear from 100 tonnes to 3,000 tonnes) of thixotropic epoxy adhesive, and a layer of reinforced fibre may be applied to the top surface of the girders, bonded to the girders by the adhesive layer. A layer of adhesive may be applied to the top surface of the reinforced fibre layer, preferably a 4 mm layer of thixotropic epoxy adhesive. A second layer of reinforced fibre may be applied to a first layer of reinforced fibre, the layers of reinforced fibre bonded by the adhesive layer. Layering of adhesive and reinforced fibre layers may be applied until desired number of reinforced fibre layers is achieved.

A layer of adhesive may be applied to the top reinforced fibre layer, preferably 4 mm of thixotropic epoxy adhesive. After drilling out any material from the predrilled holes in the composite structural panel, which may include closed cell cellular foam, the composite structural panel is placed on the adhesive layer, aligning the composite structural panel square to girders which comprise the frame.

Bolts may be inserted through the top of the composite structural panel, preferably with 50 mm diameter washers, through every predrilled hole, and then once through the bottom of the girder, install a washer and nut and tighten the bolts evenly to 325 foot pounds (125-325 range) to pre-stress the reinforced thixotropic adhesive in order to achieve full composite action before the exothermic onset of the thixotropic adhesive. On top of the deck, each predrilled hole is filled with the thixotropic glue and complete exothermic set is allowed to reach termination.

The chemical connecting means, that is the thixotropic reinforced with fibreglass, has a design value shown in table 1, by way of example only for a small bridge.

TABLE 1

| Wide | Long | Thick | Surface mass | Thixo ULS MOE | ULS MOE by mass area | Ton | ULS tons | SLS tons |
|---|---|---|---|---|---|---|---|---|
| 8 | $39^6$ | 0.125 | 39 | 20,000 | 780,000 | 2200 | 355 | 236.36364 |

So although thixotropic reinforced has SLS of 236 tons which is more than sufficient we have the problem of "uneven" surfaces between the frp deck and steel beams and the design value is based on the process of "pre-stressing" the epoxy reinforced using mechanical shear connections.

Pre-stressing the chemical connecting means between the composite structural panel and girders of the frame structure prior with the mechanical connecting means effectively squeezes the composites structural panel to the girders. As the pre-stressing is performed within the exothermic window of the thermoset resin, the mechanical and chemical connecting means achieve full composite action.

So based on an example of 10 m×9 m bridge, the total values of shear per linear meter is: chemical 236 tons, mechanical 28 tons, total 264 tons.

The composite structural panel 10 can be preferably used as a deck for a bridge, applied to the top of steel beams or girders 100 which comprise the frame of the bridge as described above. The composition and manufacture of the bridge panel, as well as the mechanical and chemical connecting means securing the panel to the bridge frame allow for composite support of longitudinal moments between the frame and composite structural panel.

The composite structural panel 10 can further include a member (not shown) positioned under the composite structural panel 10 so as to provide a cross fall between 0.01-8.0%. The member may be in the shape of a wedge. The percentage of cross fall can vary to accommodate various gradients off the panel depending on the conditions that the panel is being installed. Furthermore the member can be positioned within the composite structural panel so as to provide a similar range of cross fall. The ability to provide a cross fall within the panel or underneath the panel allows for runoff from the panel and improves safety conditions.

The above description is intended in an illustrative rather than restrictive sense. Variations may be apparent to those skilled in the art without departing from the spirit and scope of the invention as defined by the claims set out.

EXAMPLES

Example 1

In order for the bridge deck to achieve composite action with the girders it must have the following mechanical properties outlined in table 2:

TABLE 2

| Property | Average statistical test result | Taken in consideration for design |
|---|---|---|
| Tensile strength | 1,000 MPa | 800 MPa |
| Corresponding modulus of elasticity | 45,000 MPa | 35,000 MPa |
| Compression strength | 900 MPa | 700 MPa |
| Corresponding modulus of elasticity | 42,000 MPa | 35,000 MPa |
| Flexural strength | 1,000 MPa | 800 MPa |
| Corresponding modulus of elasticity | 46,000 MPa | 35,000 MPa |
| Shear strength | 50 MPa | 20 MPa |
| Shear modulus | 3,600 MPa | 2,400 MPa |
| Coefficient of linear expansion | 0.000011/° C. | 0.000011/° C. |
| Acceptable max. value of strain in GFRP | — | 0.005 < [0.006] |
| Strains changes in GFRP equal strain changes in adjacent wood or steel | — | — |
| Durability test (UV-test with changing "t" from 130° C. to −130° C. | ~150 year | ~150 year |
| Mass density | 2,050 kg/m$^3$ | 2,050 kg/m$^3$ |

Example 2

The variation of thickness between the composite structural panel and the steel beams is dependent upon the calculated longitudinal and transverse moment based on empirical analysis in the CHBDC or AASHTO during the preliminary and detail design stage.

For example where 900 tons is required on a 44 m long×9 m wide bridge the calculation is shown in table 3:

TABLE 3

| Wide | Long | Thick | Surface mass | Thixo ULS MOE | ULS MOE by mass area | Ton | ULS tons | SLS tons |
|---|---|---|---|---|---|---|---|---|
| 12 | 39 | 0.5 | 234 | 20,000 | 4,680,000 | 2200 | 2127 | 1,418 |

½" of thickness increases the shear capacity to acceptable loads in combination with procedure and mechanical bolts to prestress.

Benefit of comparing concrete deck to the composite structural panel of the present invention is shown in table 4:

TABLE 4

| Property | Steel-R. Concrete and reinforced concrete superstructures | Steel girders and composite structural panel | Results |
|---|---|---|---|
| Dynamic load allowance | 1.25 | 1.17 | 6.5% less |
|  | 1.30 | 1.21 | 7.4% less |
| Bending moment | 100% | 88% | 12% less |
| Deck mm thickness required | 225 | 204 | 9.4% less |
| Fatigue stresses in deck casing | Require design evaluation | Not required | — |

The bending moment is typically 14% less but we use 12% less and under the CHBDC fatigue stress analysis is not required.

We claim:

1. A structural assembly for a bridge, the assembly comprising:
   a support frame including a first girder and second girder substantially aligned with a longitudinal direction, the first girder and the second girder being laterally spaced apart from each other; and
   a bridge deck including a vacuum infused composite structural panel supported by and extending between the first girder and the second girder, the panel including:
      (a) a bottom and a top reinforced fibre layer;
      (b) a bottom and a top infusion medium layer;
      (c) a wood core; and
      (d) a potting material;
   wherein the bottom reinforced fibre layer is adapted to engage the entire surface of the bottom infusion medium layer, the bottom infusion medium layer is adapted to engage the entire surface of the wood core, the wood core is adapted to engage a top infusion medium layer, the top infusion medium layer is adapted to engage the top reinforced fibre layer, and the potting material impregnates, surrounds and encases the reinforced fibre layers, the infusion medium layers, and the wood core; and
   wherein the wood core comprises a plurality of wood beam elements wherein the wood beam elements are adapted adjacently and engagingly to each other and are aligned parallel to each other, and, each wood beam element has a longitudinal axis that runs parallel to the longitudinal direction of the first girder and the second girder.

2. The assembly in claim 1 wherein the plurality of wood beam elements comprises a plurality of glulam wood beam elements.

3. The assembly in claim 2 wherein the glulam wood beam elements are finger joints.

4. The assembly in claim 3 wherein at least one of the finger joints is dadoed with a rectangular groove running the top and bottom of the length of the wood beam elements.

5. The assembly of claim 1 wherein each layer of reinforced fibre comprises multiple layers of reinforced fibre, having a longitudinal general fibre orientation relative to the wood beam elements.

6. The assembly of claim 5 comprising an outer layer of reinforced fibre having a transverse general fibre orientation relative to the wood beam elements, wherein the outer layer of reinforced fibre encases the length and width of the composite structural panel.

7. The assembly of claim 1 whereby the potting material is a substance or combination of substances of suitable viscosity such that they can be used to impregnate the reinforced fibre, the infusion medium layers and surround the wood core whereby the potting material can undergo a physical state transformation from a low viscosity fluid to a rigid solid state.

8. The assembly of claim 1 wherein the composite structural panel comprises holes extending from the top surface to the bottom surface, whereby at least one pipe extends through each of said holes.

9. The assembly of claim 8 whereby mechanical connecting means extend through the holes.

10. The assembly in claim 9 whereby the mechanical connecting means is selected from a list consisting of a bolt, a A325 bolt, a grade 8 bolt or the combination of at least one bolt, at least one washer and at least one nut.

11. The assembly in claim 1 wherein the infusion medium layers comprise wire.

12. The assembly in claim 11 wherein the wire comprises chicken wire.

13. The assembly as claimed in claim 1 further comprising a member positioned under or within the structural panel to provide a cross fall between 0.01-8.0%.

* * * * *